US012602691B2

(12) United States Patent
Zhou

(10) Patent No.: US 12,602,691 B2
(45) Date of Patent: Apr. 14, 2026

(54) SYSTEMS AND METHODS FOR MAINTAINING DATA INTEGRITY AND SECURITY DURING DATA TRANSFER BETWEEN ELECTRONIC DEVICES

(71) Applicant: BANK OF AMERICA CORPORATION, Charlotte, NC (US)

(72) Inventor: Enming Zhou, Thousand Oaks, CA (US)

(73) Assignee: BANK OF AMERICA CORPORATION

(*) Notice: Subject to any disclaimer, the term of this patent is extended or adjusted under 35 U.S.C. 154(b) by 255 days.

(21) Appl. No.: 18/229,065

(22) Filed: Aug. 1, 2023

(65) Prior Publication Data

US 2025/0045758 A1      Feb. 6, 2025

(51) Int. Cl.
*G06Q 20/40* (2012.01)

(52) U.S. Cl.
CPC ................................. *G06Q 20/4016* (2013.01)

(58) Field of Classification Search
None
See application file for complete search history.

(56) References Cited

U.S. PATENT DOCUMENTS

| | | |
|---|---|---|
| 5,701,499 A | 12/1997 | Capson et al. |
| 7,107,523 B2 | 9/2006 | Bssert et al. |
| 8,812,950 B2 | 8/2014 | Sikka et al. |
| 9,063,992 B2 | 6/2015 | Bhide et al. |
| 9,442,697 B2 | 9/2016 | Miller |
| 10,915,651 B2 | 2/2021 | Navda et al. |
| 11,386,108 B2 | 7/2022 | Sheng et al. |
| 11,710,334 B2 | 7/2023 | Middendorf et al. |
| 2006/0112123 A1 | 5/2006 | Clark et al. |
| 2017/0262847 A1* | 9/2017 | Smith .................. G06Q 20/386 |
| 2017/0352022 A1* | 12/2017 | Senci ..................... G06Q 20/34 |
| 2020/0342404 A1 | 10/2020 | Jackson |
| 2021/0326894 A1* | 10/2021 | Senci .................. G06Q 20/405 |
| 2022/0067272 A1 | 3/2022 | Ripa |
| 2022/0383314 A1* | 12/2022 | Jones .................. G06Q 20/389 |
| 2022/0414113 A1 | 12/2022 | Xing et al. |
| 2023/0106058 A1 | 4/2023 | Lavery et al. |
| 2023/0130853 A1 | 4/2023 | George |
| 2023/0139208 A1 | 5/2023 | Viswanathan et al. |

* cited by examiner

*Primary Examiner* — Matthew S Gart
*Assistant Examiner* — Liz P Nguyen
(74) *Attorney, Agent, or Firm* — Moore & Van Allen PLLC; R.W. McCord Rayburn

(57) ABSTRACT

Systems, computer program products, and methods are described herein for maintaining data integrity and security during data transfer between electronic devices. Some embodiments are directed to a system including a data adapter configured to analyze records for initiating transactions to identify relationships between data fields in the records and a data engine configured to generate standard-compliant messages for initiating transactions based on the records. The system may be configured to receive records including data fields for initiating transactions and determine, using the data adapter, relationships between the data fields. The system may be configured to determine, using the data engine, whether the records include required information for conducting transactions based on a messaging standard and generate standard-compliant messages for initiating and/or conducting the transactions based on transaction data in the data fields.

20 Claims, 6 Drawing Sheets

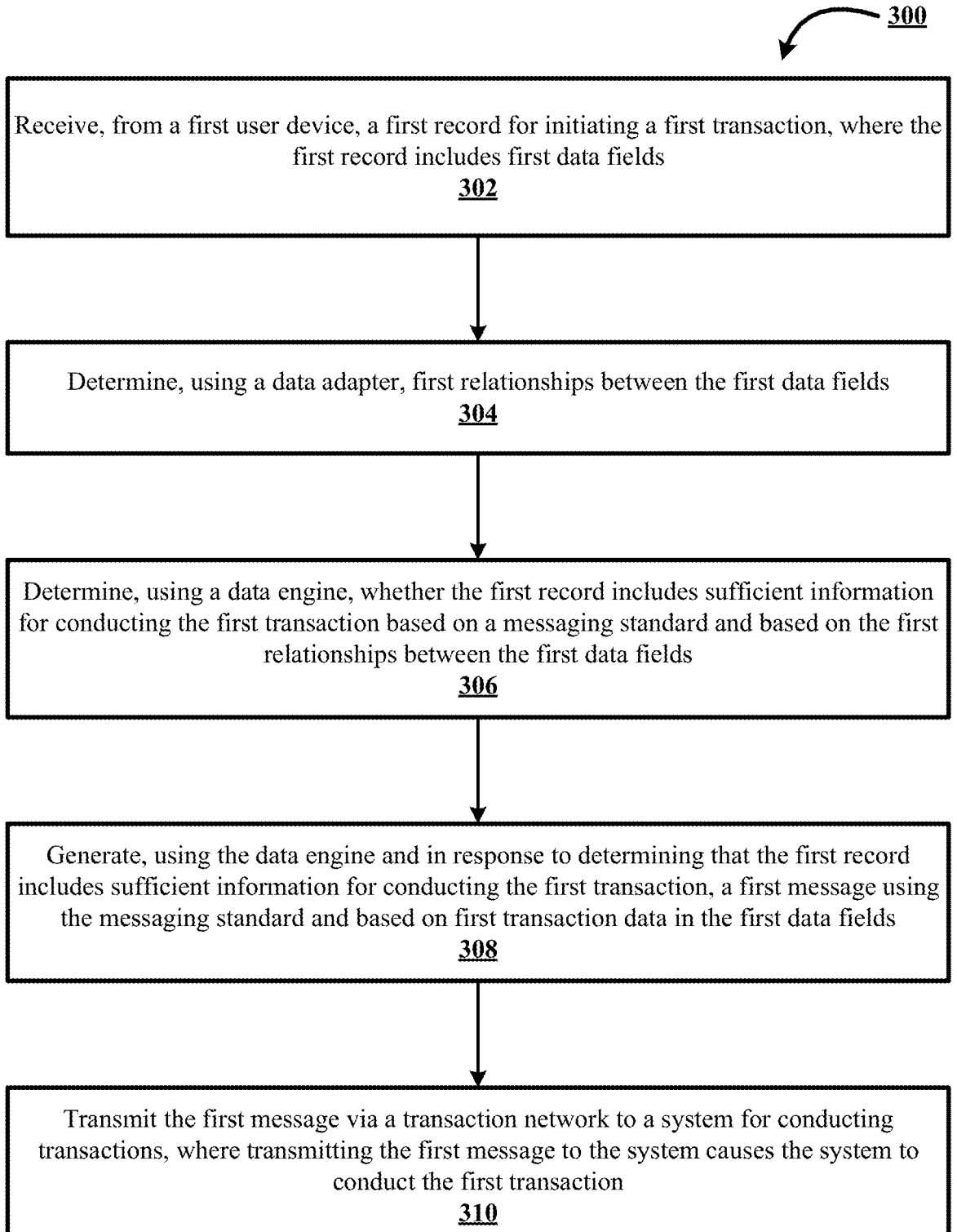

300

Receive, from a first user device, a first record for initiating a first transaction, where the first record includes first data fields
302

Determine, using a data adapter, first relationships between the first data fields
304

Determine, using a data engine, whether the first record includes sufficient information for conducting the first transaction based on a messaging standard and based on the first relationships between the first data fields
306

Generate, using the data engine and in response to determining that the first record includes sufficient information for conducting the first transaction, a first message using the messaging standard and based on first transaction data in the first data fields
308

Transmit the first message via a transaction network to a system for conducting transactions, where transmitting the first message to the system causes the system to conduct the first transaction
310

FIGURE 3

SYSTEMS AND METHODS FOR MAINTAINING DATA INTEGRITY AND SECURITY DURING DATA TRANSFER BETWEEN ELECTRONIC DEVICES

TECHNOLOGICAL FIELD

Example embodiments of the present disclosure relate to systems and method for maintaining data integrity and security during data transfer between electronic devices.

BACKGROUND

Records including data may be transferred over networks between electronic devices. Additionally, users may view the data in the records and input the data into other records stored on an electronic device, which are then transferred to other electronic devices and/or systems.

BRIEF SUMMARY

Systems, methods, and computer program products are provided for maintaining data integrity and security during data transfer between electronic devices.

In one aspect, the present invention is directed to a system for maintaining data integrity and security during data transfer between electronic devices. The system may include a data adapter configured to analyze records for initiating transactions to identify relationships between data fields in the records and a data engine configured to generate standard-compliant messages for initiating transactions based on the records. The system may include a processing device and a non-transitory storage device including computer program code stored thereon. The computer program code may include computer instructions configured to cause the processing device to receive, from a first user device, a first record for initiating a first transaction, where the first record includes first data fields and determine, using the data adapter, first relationships between the first data fields. The computer program code may include computer instructions configured to cause the processing device to determine, using the data engine, whether the first record includes required information for conducting the first transaction based on a messaging standard and based on the first relationships between the first data fields. The computer program code may include computer instructions configured to cause the processing device to generate, using the data engine and in response to determining that the first record includes required information for conducting the first transaction, a first message using the messaging standard and based on first transaction data in the first data fields. The computer program code may include computer instructions configured to cause the processing device to transmit the first message via a transaction network to another system for conducting transactions, where transmitting the first message to the other system causes the other system to conduct the first transaction.

In some embodiments, the messaging standard may include a metadata repository and messaging syntaxes for conducting transactions. Additionally, or alternatively, the computer program code may include computer instructions configured to cause the processing device to, when generating the first message, generate, using the data engine, the first message using the metadata repository and the messaging syntaxes of the messaging standard.

In some embodiments, the data engine may be configured by a configuration file to determine whether records include required information for conducting transactions and generate standard-compliant messages for initiating transactions, and the configuration file may be based on technical literature establishing the messaging standard.

In some embodiments, the data engine may include one of more machine learning models configured to determine whether records include required information for conducting transactions and generate standard-compliant messages for initiating transactions.

In some embodiments, the first data fields may include first labels and the first transaction data, and the first labels may include first identifiers of the first transaction data. Additionally, or alternatively, the first transaction data may include first information items for conducting the first transaction, and each first data field of the first data fields may include (i) a first identifier of the first identifiers or (ii) a first information item of the first information items.

In some embodiments, the computer program code may include computer instructions configured to cause the processing device to analyze, using the data adapter, the first record to determine for each first data field whether the first data field includes (i) a first identifier or (ii) a first information item. Additionally, or alternatively, the computer program code may include computer instructions configured to cause the processing device to, when determining the first relationships between the first data fields, determine, using the data adapter, the first relationships between the first labels and the first transaction data by determining for each first information item a corresponding first identifier.

In some embodiments, the computer program code may include computer instructions configured to cause the processing device to, when determining whether the first record includes required information for conducting the first transaction, determine, using the data engine, whether the first record includes required information for conducting the first transaction based on the first labels and the first transaction data.

In some embodiments, the first transaction may be between a first entity and a second entity, and the computer program code may include computer instructions configured to cause the processing device to transmit, in response to transmitting the first message, a first notification to a first system of the first entity confirming transmission of the first message and a second notification to a second system of the second entity confirming transmission of the first message.

In some embodiments, the first transaction may be between a first entity, a second entity, and a third entity and the computer program code may include computer instructions configured to cause the processing device to transmit, in response to transmitting the first message, a first notification to a first system of the first entity confirming transmission of the first message, a second notification to a second system of the second entity confirming transmission of the first message, and a third notification to a third system of the third entity confirming transmission of the first message.

In some embodiments, the computer program code may include computer instructions configured to cause the processing device to receive, from a second user device, a second record for initiating a second transaction, where the second record includes second data fields in a second format different from a first format of the first data fields of the first record, and determine, using the data adapter, second relationships between the second data fields. Additionally, or alternatively, the computer program code may include computer instructions configured to cause the processing device to determine, using the data engine, whether the second record includes required information for conducting the second transaction based on the messaging standard and based on the second relationships. In some embodiments, the computer program code may include computer instructions configured to cause the processing device to generate, using the data engine and in response to determining that the second record includes required information for conducting the second transaction, a second message using the messaging standard and based on second transaction data in the second data fields and transmit the second message via the transaction network to the other system for conducting transactions, where transmitting the second message to the other system causes the other system to conduct the second transaction.

In some embodiments, the transaction network may include a communication network between systems of a plurality of financial institutions for securely communicating messages for conducting transactions.

In some embodiments, the first transaction may be a loan trade, where the first record includes an email and a CSV-formatted funding schedule, and the CSV-formatted funding schedule includes collateral information for settling the loan trade.

In some embodiments, the first transaction may be a mortgage-backed security trade, where the first record includes an email and a CSV-formatted pool settlement, and the CSV-formatted pool settlement includes information associated with the mortgage-backed security trade.

In another aspect, the present invention is directed to a computer program product for maintaining data integrity and security during data transfer between electronic devices. The computer program product may include a non-transitory computer-readable medium including code causing an apparatus to receive, from a first user device, a first record for initiating a first transaction, where the first record includes first data fields. The non-transitory computer-readable medium may include code causing the apparatus to determine, using a data adapter, first relationships between the first data fields, where the data adapter is configured to analyze records for initiating transactions to identify relationships between data fields in the records. The non-transitory computer-readable medium may include code causing the apparatus to determine, using a data engine, whether the first record includes required information for conducting the first transaction based on a messaging standard and based on the first relationships between the first data fields, where the data engine is configured to generate standard-compliant messages for initiating transactions based on the records. The non-transitory computer-readable medium may include code causing the apparatus to generate, using the data engine and in response to determining that the first record includes required information for conducting the first transaction, a first message using the messaging standard and based on first transaction data in the first data fields. The non-transitory computer-readable medium may include code causing the apparatus to transmit the first message via a transaction network to a system for conducting transactions, where transmitting the first message to the system causes the system to conduct the first transaction.

In some embodiments, the messaging standard may include a metadata repository and messaging syntaxes for conducting transactions. Additionally, or alternatively, the non-transitory computer-readable medium may include code causing the apparatus to, when generating the first message, generate, using the data engine, the first message using the metadata repository and the messaging syntaxes of the messaging standard.

In some embodiments, the data engine is configured by a configuration file to determine whether records include required information for conducting transactions and generate standard-compliant messages for initiating transactions, and the configuration file is based on technical literature establishing the messaging standard.

In another aspect, the present invention is directed to a method for maintaining data integrity and security during data transfer between electronic devices. The method may include receiving, from a first user device, a first record for initiating a first transaction, where the first record includes first data fields and determining, using a data adapter, first relationships between the first data fields, where the data adapter is configured to analyze records for initiating transactions to identify relationships between data fields in the records. The method may include determining, using a data engine, whether the first record includes required information for conducting the first transaction based on a messaging standard and based on the first relationships between the first data fields, where the data engine is configured to generate standard-compliant messages for initiating transactions based on the records. The method may include generating, using the data engine and in response to determining that the first record includes required information for conducting the first transaction, a first message using the messaging standard and based on first transaction data in the first data fields. The method may include transmitting the first message via a transaction network to a system for conducting transactions, where transmitting the first message to the system causes the system to conduct the first transaction.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components or blocks than those shown in the figures.

Figure 1A:
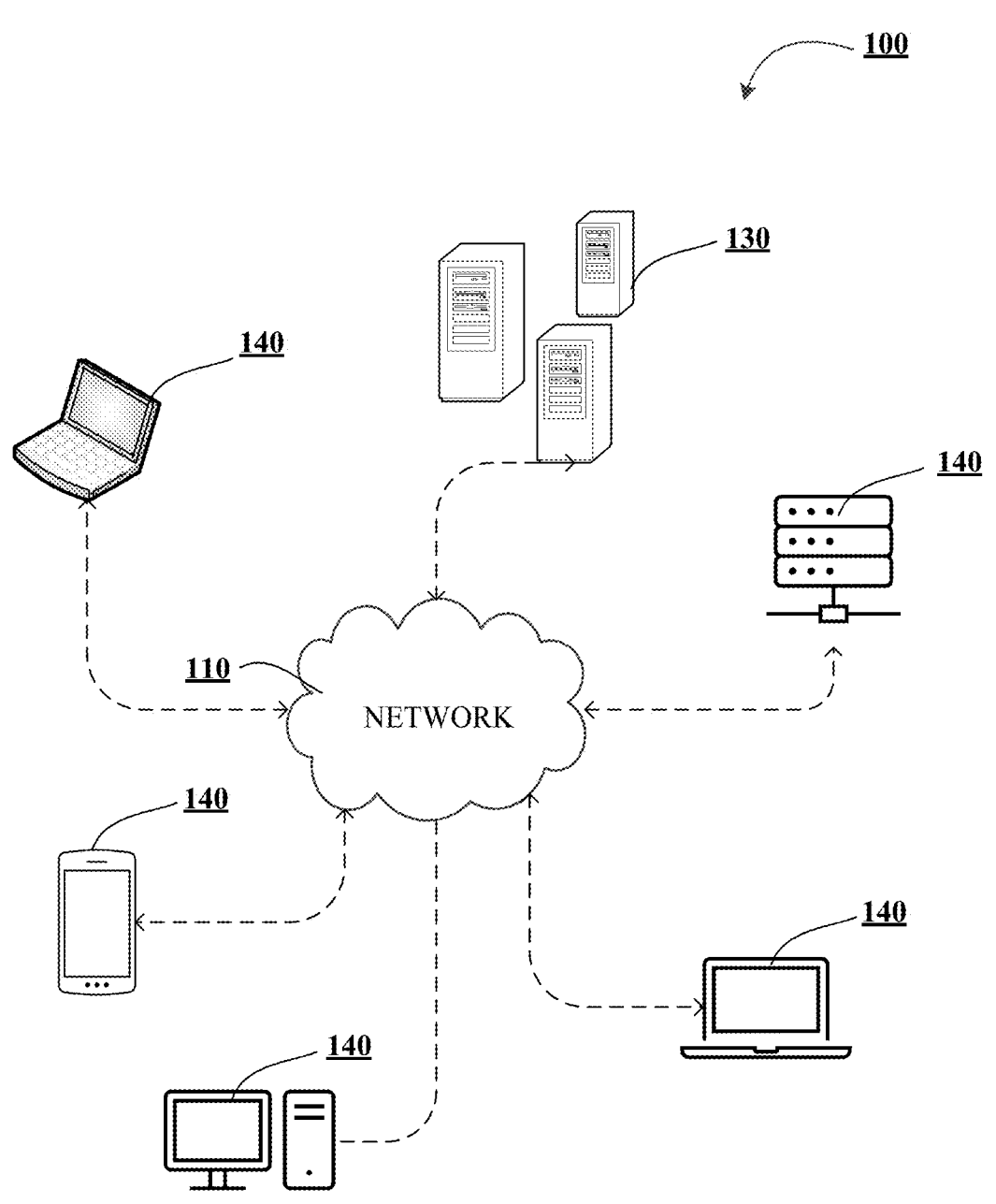
Figure 1B:
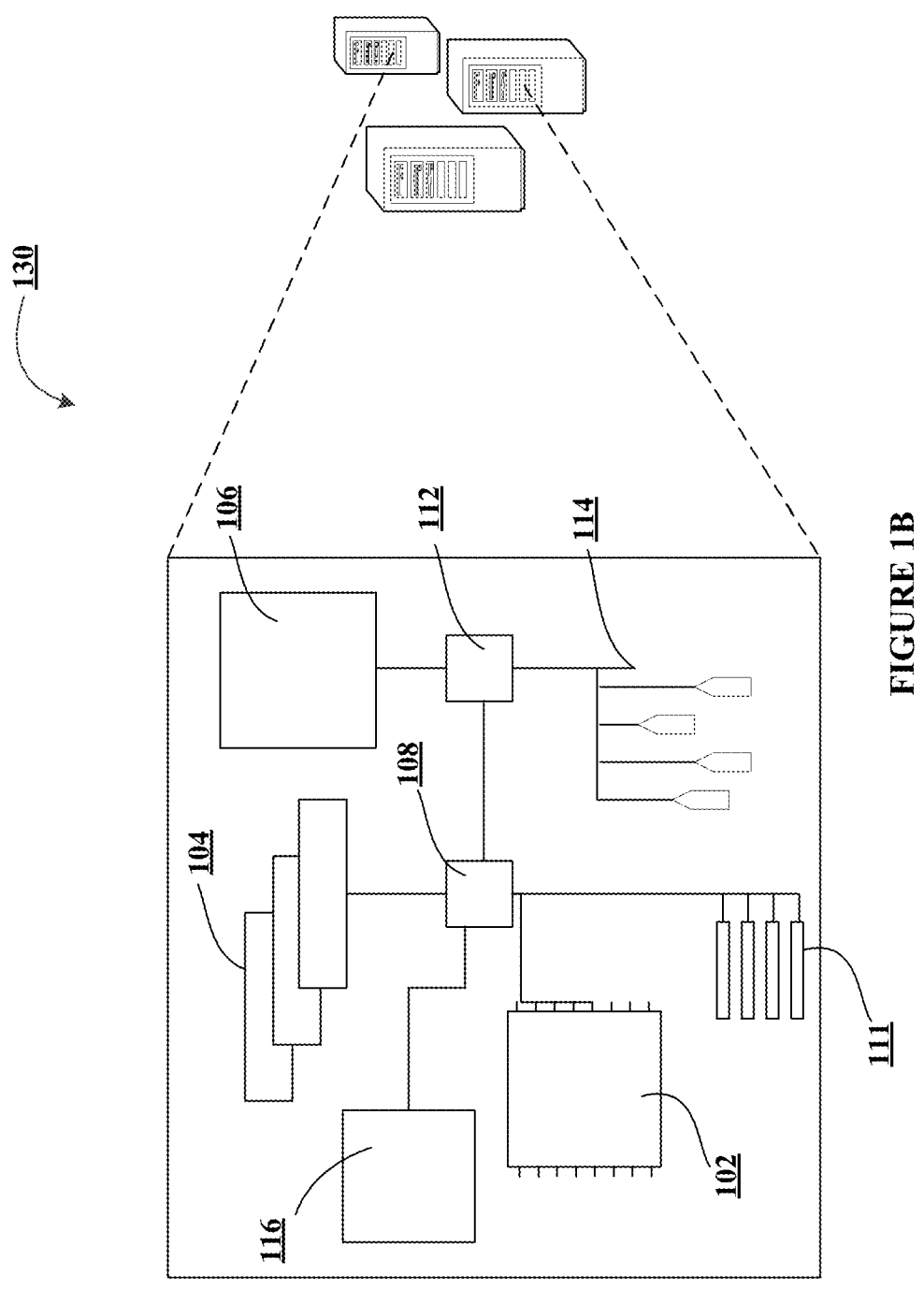
Figure 1C:
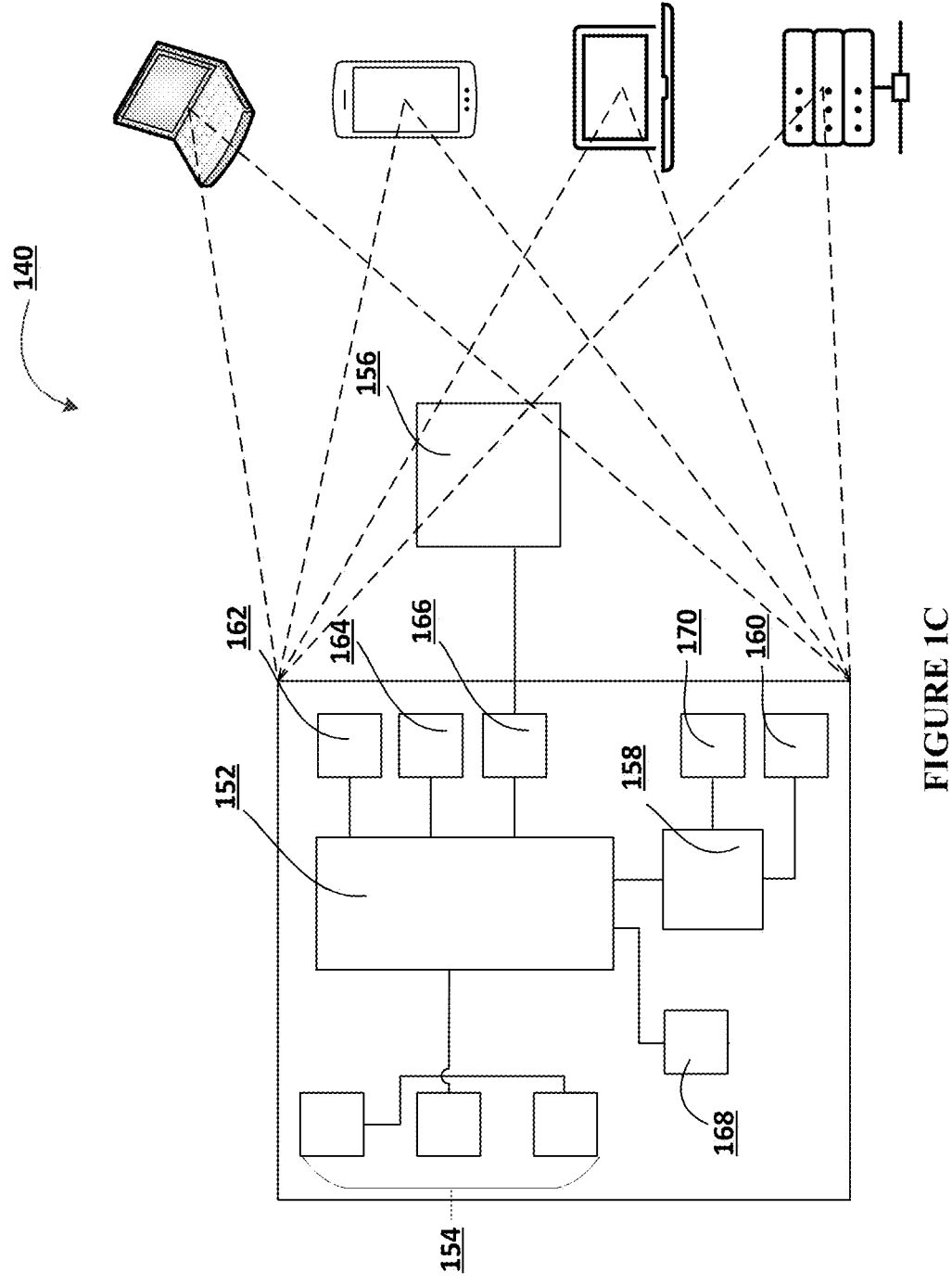
Figure 2:
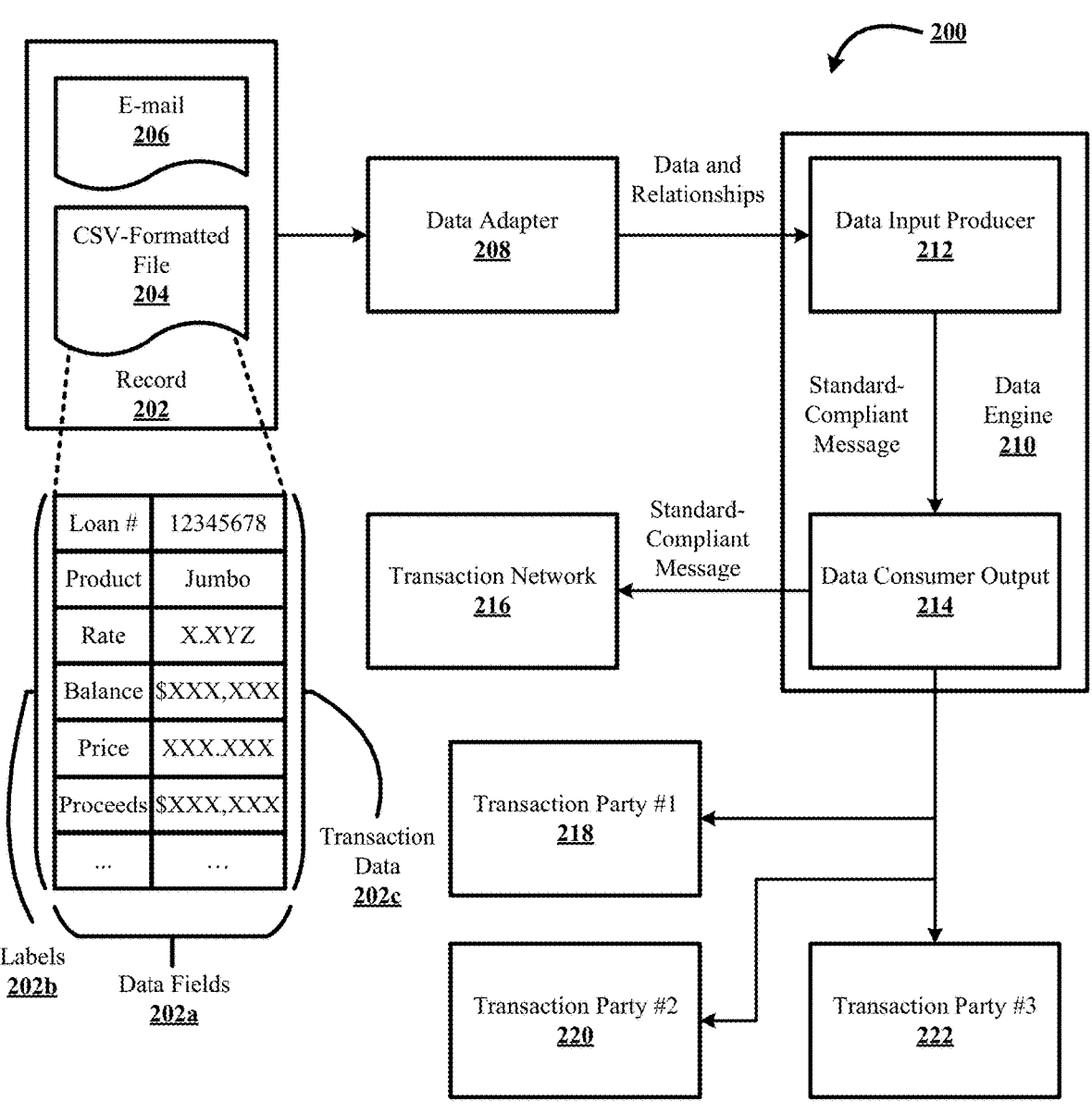

FIGS. 1A-1C illustrates technical components of an exemplary distributed computing environment for maintaining data integrity and security during data transfer between electronic devices, in accordance with an embodiment of the disclosure;

FIG. 2 illustrates a process flow for maintaining data integrity and security during data transfer between electronic devices, in accordance with an embodiment of the disclosure.

FIG. 3 illustrates a process flow for maintaining data integrity and security during data transfer between electronic devices, in accordance with an embodiment of the disclosure.

Figure 4:
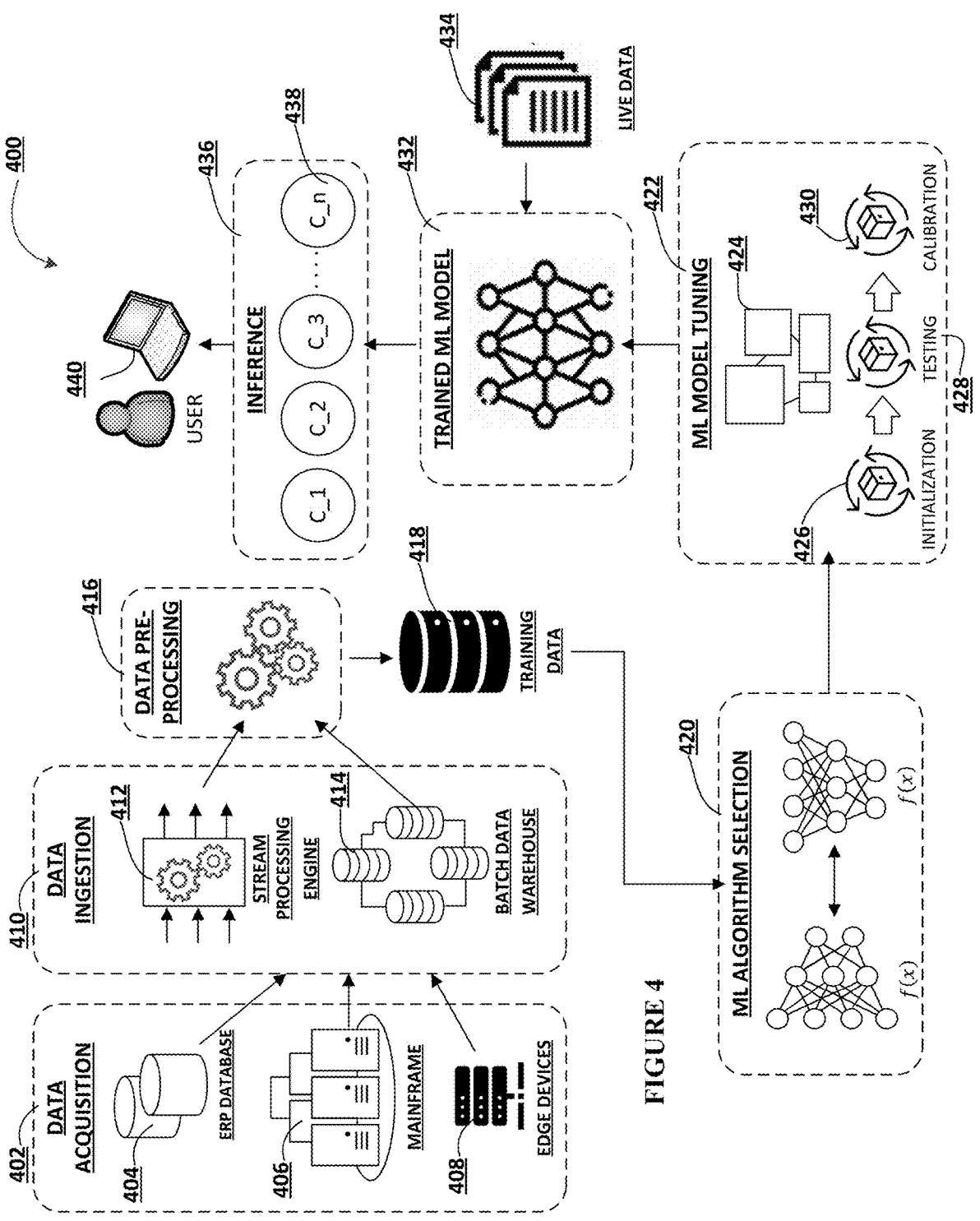

FIG. 4 illustrates an exemplary architecture of a machine learning (ML) subsystem, in accordance with an embodiment of the invention.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers, or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository—a storage location where one or more resources are organized, stored, and retrieved electronically using a computing device.

As used herein, a "resource transfer," "resource distribution," or "resource allocation" may refer to any transaction, activities, or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer," a "transaction," a "transaction event," or a "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e., paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated, it could mean that the transaction has already occurred, is in the process of occurring or being processed, or that the transaction has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application.

As noted, records (e.g., files) including data may be transferred over networks between electronic devices. Additionally, users may view the data in the records and input the data into other records stored on an electronic device, which are then transferred to other electronic devices and/or systems. For example, during a loan trade settlement process, a party to the transaction (e.g., the seller) may transfer a record (e.g., a CSV-formatted funding schedule, an email, and/or the like) including data (e.g., collateral information) for initiating the transaction (e.g., the loan trade) to another party to the transaction (e.g., the buyer). One or more users for each of the parties then accesses the record to view the data and manually re-enters the data in one or more other systems (e.g., accounting systems for each party) to account for the transaction and initiate the transaction between financial institution accounts of the parties. After this process is complete, the transaction may be initiated, but settlement of the transaction requires at least 12 hours.

As another example, during a mortgage-backed security trade settlement process, a party to the transaction (e.g., the issuer) may transfer a record (e.g., a CSV-formatted pool settlement, an email, and/or the like) including data (e.g., security information, a Committee on Uniform Securities Identification Procedures (CUSIP) number, and/or the like) for initiating the transaction (e.g., the mortgage-backed security trade) to another party to the transaction (e.g., the buyer). One or more users for each of the parties then accesses the record to view the data and manually re-enters the data in one or more other systems (e.g., accounting systems for each party) to account for the transaction and initiate the transaction between financial institution accounts of the parties. After this process is complete, the transaction may be initiated, but settlement of the transaction requires at least 12 hours.

Such settlement processes increase the likelihood of misappropriation of the data and corruption of the data and introduce significant delays. For example, transferring records over networks via email exposes the data in the records to attempts to intercept the communication or otherwise misappropriate the data and/or the records. Additionally, the manual re-entry of the data from the records into other systems increases the likelihood that a user will improperly re-enter the data resulting in corruption of the data in the other systems. Finally, the manual re-entry of the data and the period of time waiting for settlement of the transaction introduces significant delays. All three of these issues (i.e., misappropriation of data, corruption of data, and delays) consume significant computing resources, such as processing resources, storage resources, network resources, and/or the like.

Some embodiments described herein provide a system for maintaining data integrity and security during data transfer between electronic devices. The system may include a data adapter (e.g., a funding data adapter, a pool settlement data adapter, and/or the like) configured to analyze records for initiating transactions to identify relationships between data fields in the records. The system may also include a data engine (e.g., including a data input producer, a data consumer output, and/or the like) configured to generate standard-compliant messages for initiating transactions based on the records. Rather than transferring records over networks via email, the system may use the data adapter to analyze the records (e.g., the CSV-formatted funding schedule, the CSV-formatted pool settlement, the email, and/or the like) including the data (e.g., the collateral information, the security information, the CUSIP number, and/or the like) for initiating the transactions (e.g., the loan trade, the mortgage-backed security trade, and/or the like) and determine relationships between the data fields in the records regardless of formatting of the data fields and extract the data. The system may then use the data engine to determine, based on the identified relationships and the extracted data, whether the records include the information required to conduct the transactions based on a messaging standard (e.g., an International Organization of Standardization (ISO) 20022 standard). The system may also use the data engine to generate standard-compliant messages for initiating the transactions and provide the standard-compliant messages directly to transaction networks that perform the settlement processes.

By processing the records using the data adapter, the system may prevent exposure of the data in the records to attempts to intercept emails or otherwise misappropriate the data and/or the records. By processing the records using the data adapter, the system may also be agnostic and analyze records having a variety of formats. By using the data adapter and the data engine to analyze the data and generate standard-compliant messages, the system may eliminate the manual re-entry of the data from the records into other systems, thereby eliminating the likelihood that a user will improperly re-enter the data resulting in corruption of the data in the other systems. Finally, by using the data engine to generate standard-compliant messages and transmit them directly to transaction networks that perform the settlement processes, the system eliminates the delays caused by the manual re-entry of the data and the periods of time waiting for settlement of the transactions.

What is more, the present disclosure provides a technical solution to a technical problem. As described herein, the technical problem includes consumption of computing resources due to misappropriation of data, corruption of data, and delays. The technical solution presented herein allows for automatic, on-site, real-time, processing of data records and generation and transmission of standard-compliant messages directly to transaction networks, which eliminates opportunities for misappropriation of the records, corruption of the records due to human error, and delays. In particular, system for maintaining data integrity and security during data transfer between electronic devices is an improvement over existing solutions (i) with fewer steps to achieve the solution, thus reducing the amount of computing resources, such as processing resources, storage resources, network resources, and/or the like, that are being used, (ii) providing a more accurate solution to the problems, thus reducing the number of resources required to remedy any errors made due to a less accurate solution, (iii) removing manual input and waste from the implementation of the solution, thus improving speed and efficiency of the process and conserving computing resources, and (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment 100 for maintaining data integrity and security during data transfer between electronic devices, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and in some embodiments one or more of the systems, devices, and/or servers may be combined into a single system, device, and/or server, and/or be made up of multiple systems, devices, and/or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server (e.g., the system 130). In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file servers, and/or the like, various forms of digital computing devices, such as laptops, desktops, video recorders, audio/video players, radios, workstations, and/or the like, and/or any other auxiliary network devices, such as wearable devices, Internet-of-things devices, electronic kiosk devices, entertainment consoles, mainframes, and/or the like, and/or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, and/or the like. The network 110 may be secure and/or unsecure and may also include wireless and/or wired and/or optical interconnection technology.

The structure of the distributed computing environment and its components, connections and relationships, and their functions, are exemplary, and are not meant to limit implementations of the disclosures described and/or claimed herein. For example, the distributed computing environment 100 may include more, fewer, and/or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102 (e.g., a processing device), memory 104, a storage device 106, and an input/output (I/O) device 116. The system 130 may also include a high-speed interface 108 connecting to the memory 104, and a low-speed interface 112 connecting to low-speed bus 114 and storage device 106. Each of the components 102, 104, 106, 108, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. For example, the processor 102 may execute computer program code stored on a non-transitory storage device (e.g., the memory 104), which may cause the processor 102 to perform one or more of the process flows described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may include a computer-readable medium, such as a floppy disk device, a hard disk device, an optical disk device, a tape device, a flash memory, or other similar solid state memory device, and/or an array of devices, including devices in a storage area network or other configurations. A computer program product can be tangibly embodied in an information carrier. The computer program product may also contain instructions that, when executed, perform one or more methods, such as those described herein. The information carrier may be a computer-readable medium and/or a machine-readable medium, such as the memory 104, the storage device 106, and/or memory on processor 102.

The high-speed interface 108 manages bandwidth-intensive operations for the system 130, while the low-speed interface 112 (e.g., a low-speed controller) manages lower bandwidth-intensive operations. Such allocation of functions is exemplary. In some embodiments, the high-speed interface 108 is coupled to memory 104, the input/output (I/O) device 116 (e.g., through a graphics processor or accelerator), and high-speed expansion ports 111, which may accept various expansion cards. In some embodiments, the low-speed interface 112 may be coupled to the storage device 106 and the low-speed bus 114 (e.g., a low-speed expansion port). The low-speed bus 114, which may include various communication ports (e.g., USB, Bluetooth, Ethernet, wireless Ethernet), may be coupled to one or more input/output devices, such as a keyboard, a pointing device, a scanner, and/or a networking device, such as a switch or router (e.g., through a network adapter).

The system 130 may be implemented in a number of different forms. For example, the system 130 may be implemented as a standard server, or multiple times in a group of such servers. In some embodiments, the system 130 may also be implemented as part of a rack server system or a personal computer such as a laptop computer. Additionally, or alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152 (e.g., a processing device), memory 154, an input/output device 156 (e.g., a display), a communication interface 158, and a transceiver 160, among other components. The end-point device(s) 140 may also be provided with a storage device, such as a microdrive or other device, to provide additional storage. Each of the components 152, 154, 156, 158, and 160, may be interconnected using various buses, cables, and/or the like and several of the components may be mounted on a common motherboard or in other manners as appropriate.

The processor 152 may be configured to execute instructions within the end-point device(s) 140, including instructions stored in the memory 154, which in one embodiment may include the instructions of an application that may perform the functions disclosed herein, including certain logic, data processing, and data storing functions. For example, the processor 152 may execute computer program code stored on a non-transitory storage device (e.g., the memory 154), which may cause the processor 152 to perform one or more of the process flows described herein. The processor 152 may be implemented as a chipset of chips that include separate and multiple analog and digital processors. The processor 152 may be configured to provide, for example, for coordination of the other components of the end-point device(s) 140, such as control of user interfaces, applications run by end-point device(s) 140, and/or wireless communication by end-point device(s) 140.

The processor 152 may be configured to communicate with the user through a control interface 164 and a display interface 166 coupled to the input/output device 156. The input/output device 156 may be, for example, a TFT LCD (Thin-Film-Transistor Liquid Crystal Display) or an OLED (Organic Light Emitting Diode) display, or other appropriate display technology. The display interface 166 may include appropriate circuitry and be configured for driving the input/output device 156 to present graphical and other information to a user. The control interface 164 may receive commands from a user and convert them for submission to the processor 152. In addition, an external interface 168 may be provided in communication with the processor 152, so as to enable near area communication of end-point device(s) 140 with other devices. External interface 168 may provide, for example, for wired communication and/or wireless communication, and the end-point device(s) 140 may include multiple external interfaces 168.

The memory 154 stores information within the end-point device(s) 140. The memory 154 may be implemented as one or more of a computer-readable medium or media, a volatile memory unit or units, and/or a non-volatile memory unit or units. Expansion memory may also be provided and connected to end-point device(s) 140 through an expansion interface, which may include, for example, a SIMM (Single In Line Memory Module) card interface. Such expansion memory may provide extra storage space for end-point device(s) 140 and may also store applications and/or other information therein. In some embodiments, expansion memory may include instructions to carry out or supplement the processes described herein and may include secure information. For example, expansion memory may be provided as a security module for end-point device(s) 140 and may be programmed with instructions that permit secure use of end-point device(s) 140. Additionally, or alternatively, secure applications may be provided via SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product may include instructions that, when executed, perform one or more methods, such as those described herein. The information carrier may be a computer-readable medium and/or a machine-readable medium, such as the memory 154, expansion memory, memory on the processor 152, and/or a propagated signal that may be received, for example, over transceiver 160 and/or external interface 168.

In some embodiments, a user may use the end-point device(s) 140 to transmit and/or receive information and/or commands to and/or from the system 130 via the network 110. Communication between the system 130 and the end-point device(s) 140 may be subject to an authentication protocol allowing the system 130 to maintain security by permitting only authenticated users and/or processes to access protected resources of the system 130, which may include servers, databases, applications, and/or any of the components described herein. To this end, the system 130 may trigger an authentication subsystem that may require the user and/or the process to provide authentication credentials to determine whether the user and/or the process is eligible to access the protected resources. Once the authentication credentials are validated and the user and/or the process is authenticated, the authentication subsystem may provide the user and/or the process with permissioned access to the protected resources. Similarly, the end-point device(s) 140 may provide the system 130 and/or other client devices permissioned access to the protected resources of the end-point device(s) 140, which may include a GPS (Global Positioning System) device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes and/or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. The communication interface 158 may provide for communications under various telecommunications standards (e.g., 2G, 3G, 4G, 5G, and/or the like) using their respective layered protocol stacks. These communications may occur through a transceiver 160, such as a radio-frequency transceiver. Short-range communication may occur, such as using a Bluetooth, Wi-Fi, or other such transceiver. GPS receiver module 170 may provide additional navigation-related and/or location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker (e.g., in a handset) of end-point device(s) 140. Such sound may include sound from voice telephone calls, may include recorded sound (e.g., voice messages, music files, and/or the like), and/or may include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow 200 for maintaining data integrity and security during data transfer between electronic devices, in accordance with an embodiment of the disclosure. As shown in FIG. 2, the process flow 200 may include a record 202 (e.g., a file, a data file, and/or the like), a data adapter 208, a data engine 210, a transaction network 216, and multiple transaction parties, such as a transaction party #1 218, a transaction party #2 220, and a transaction party #3 222.

As also shown in FIG. 2, the record 202 may include a CSV-formatted file 204 and/or an email 206. For example, the record 202 may include data including collateral information in the CSV-formatted file 204 (e.g., a comma-separated values (CSV) file, a spreadsheet, a Microsoft Excel file, and/or the like) sent via the email 206, which may include additional information for initiating a transaction, such as a loan trade settlement. As another example, the record 202 may include data including security information (e.g., a CUSIP number, pool settlement information, and/or the like) in the CSV-formatted file 204 (e.g., a comma-separated values (CSV) file, a spreadsheet, a Microsoft Excel file, and/or the like) sent via the email 206, which may include additional information for initiating a transaction, such as a mortgage-backed security trade settlement.

As shown in FIG. 2, the record 202 may include a plurality of data fields 202a in a format. For example, the data fields 202a of the record 202 shown in FIG. 2 are formatted in two columns and a plurality of rows, where the data fields 202a in one column (e.g., the left column in FIG. 2) include labels 202b and the data fields 202a in the other column (e.g., the right column in FIG. 2) include transaction data 202c. Furthermore, the labels 202b include identifiers (e.g., "Loan #," "Product," "Rate," "Balance," "Price," "Proceeds," and/or the like) of the transaction data 202c. Finally, the transaction data 202c includes information items (e.g., "12345678," "Jumbo," "X.XYZ," "$XXX,XXX," "XXX.XXX," "$XXX,XXX," and/or the like). In this regard, the data fields 202a of the record 202 shown in FIG. 2 are formatted such that the identifiers in the labels 202b identify the information items of the transaction data 202c in the corresponding row. As will be appreciated by one of ordinary skill in the art in view of the present disclosure, the data fields 202a of the record 202 may be formatted in a variety of other manners (e.g., such that labels correspond to data in corresponding columns), may include additional or fewer labels 202b, additional or less transaction data 202c, and/or the like.

As shown in FIG. 2, the process flow 200 may include receiving the record 202 using the data adapter 208. In some embodiments, the data adapter 208 may be configured to extract data and relationships from records of various formats. Additionally, or alternatively, the data adapter 208 may include a pluggable data driver of a Regulated Extract Transform Loading (RETL) process. For example, the data adapter 208 may include a funding data adapter configured to analyze and/or extract data from a collateral funding schedule (e.g., in the CSV-formatted file 204) for a loan trade settlement. As another example, the data adapter 208 may include a pool settlement data adapter configured to analyze and/or extract data from a pool settlement (e.g., in the CSV-formatted file 204) for a mortgage-backed security trade settlement.

In some embodiments, the process flow 200 may include analyzing, using the data adapter 208, the record 202 to determine, for each of the data fields 202a, whether the data field includes an identifier or an information item. For example, the process flow 200 may include analyzing, using the data adapter 208, the record 202 to determine which of the data fields 202a include labels and which of the data fields 202a include transaction data.

In some embodiments, the process flow 200 may include determining, using the data adapter 208, relationships between the labels 202b and the transaction data 202c. For example, the process flow 200 may include determining, using the data adapter 208, that each of the labels 202b corresponds to the transaction data 202c in the corresponding row. Furthermore, the process flow 200 may include determining for each information item in the transaction data 202c a corresponding identifier in the labels 202b. In other words, the process flow 200 may include using the data adapter 208 to identify relationships between the data fields 202a, relationships between the labels 202b and the transaction data 202c, relationships between the identifiers and/or the information items, and/or the like.

As shown in FIG. 2, the process flow 200 may include providing (e.g., with the data adapter 208) the data and the relationships from the record 202 to the data engine 210. As also shown in FIG. 2, the data engine 210 may include a data input producer 212 and a data consumer output 214. In some embodiments, the process flow 200 may include receiving the data and the relationships from the record 202 with the data input producer 212 of the data engine 210.

Additionally, or alternatively, the process flow 200 may include determining with the data input producer 212 and/or the data engine 210 whether the record 202 includes required information for conducting a transaction based on a messaging standard. For example, the data fields 202a of the record 202 may be missing one or more of the labels 202b, one or more of the transaction data 202c, one or more of the identifiers, one or more of the information items, and/or the like necessary to complete the transaction and/or fully construct a message for initiating the transaction. In some embodiments, the process flow 200 may include providing a notification to one or more user devices and/or one or more systems associated with entities involved in the transaction (e.g., the buyer, the seller, the issuer, one or more financial institutions, and/or the like) in response to determining that the record 202 does not include required information for conducting the transaction.

In some embodiments, the messaging standard may include one or more messaging standards established by a standard-setting organization for transmitting messages through a transaction network to initiate and/or conduct transactions, such as the ISO 20022 standard. In some embodiments, the messaging standard may include a flexible standard for financial messages that enables interoperability between financial institutions. For example, the messaging standard may be supported by one or more transaction networks, such as the Society for Worldwide Interbank Financial Telecommunication (SWIFT) network, the CBI network, the FedNow instant payment service, and/or the like. In some embodiments, the process flow 200 may include automatedly mapping data from a funding schedule to ISO 20022 data categories and elements in XML and JSON. The ISO 20022 standard includes a metadata repository including descriptions of messages and business processes, and a maintenance process for the repository content. The repository includes financial services metadata that has been shared and standardized across the industry. The metadata may be stored in Unified Modeling Languages (UML) models with a special ISO 20022 UML outline. The ISO 20022 standard also includes the ISO 20022 metamodel-a model of the models. A UML outline may be the metamodel transformed into UML. In this way, metadata may be transformed into the syntax of messages used in financial networks. For example, the ISO 20022 standard may use the XML Schema. Although the ISO 20022 standard has been described herein, one of ordinary skill in the art in view of the present disclosure would appreciate that the messaging standard used and/or applied by the data engine 210 may include other standards for transmitting messages through a transaction network.

In some embodiments, the data engine 210 may be configured by a configuration file to determine whether records include required information for conducting transactions and generate standard-compliant messages for initiating transactions. For example, the configuration file may be based on technical literature establishing the messaging standard. In this regard, the process flow 200 may include reconfiguring the data engine 210 using a new configuration file in response to changes made to the messaging standard, implementation and/or adoption of a new messaging standard, and/or the like.

As shown in FIG. 2, the process flow 200 may include generating, using the data input producer 212 and/or the data engine 210, a standard-compliant message. For example, the process flow 200 may include generating the standard-compliant message using a metadata repository and messaging syntaxes for conducting transactions of the messaging standard as well as the data and the relationships from the record 202.

As shown in FIG. 2, the process flow 200 may include providing and/or transmitting, using the data consumer output 214 and/or the data engine 210, the standard-compliant message via the transaction network 216 (e.g., to a system for conducting transactions). By providing and/or transmitting the standard-compliant message via the transaction network 216, the process flow 200 may cause one or more systems communicatively connected to the transaction network 216 to conduct the transaction (e.g., the loan trade settlement, the mortgage-backed security trade settlement, and/or the like).

As shown in FIG. 2, the process flow 200 may include providing and/or transmitting (e.g., in response to transmitting the standard-compliant message) notifications to one or more of the transaction parties, such as the transaction party #1 218, the transaction party #2 220, and the transaction party #3 222. For example, the process flow 200 may include transmitting notifications to one or more systems associated with the one or more of the transaction parties confirming transmission of the standard-compliant message. In some embodiments, the one or more of the transaction parties may include the buyer, the seller, the issuer, one or more financial institutions, and/or the like.

In this way, the process flow 200 may prevent exposure of the data in the record 202 to attempts to intercept emails or otherwise misappropriate the data and/or the record 202 and be agnostic and capable of analyzing records having a variety of formats. Furthermore, the process flow 200 may eliminate the manual re-entry of the data from the record 202 into other systems, thereby eliminating the likelihood that a user will improperly re-enter the data resulting in corruption of the data in the other systems. Additionally, or alternatively, the process flow 200 may eliminates the delays caused by the manual re-entry of the data and the periods of time waiting for settlement of the transaction.

As will be appreciated by one of ordinary skill in the art in view of the present disclosure, the process flow 200 may include additional steps, alternative steps, and/or the like. The process flow 200 may include additional embodiments, such as any single embodiment or any combination of embodiments described herein. Although FIG. 2 shows example blocks of the process flow 200, in some embodiments, the process flow 200 may include additional blocks, fewer blocks, different blocks, or differently arranged blocks than those depicted in FIG. 2. Additionally, or alternatively, two or more of the blocks of the process flow 200 may be performed in parallel.

FIG. 3 illustrates a process flow 300 for maintaining data integrity and security during data transfer between electronic devices, in accordance with an embodiment of the disclosure. In some embodiments, one or more systems including data adapters and data engines (e.g., similar to the data adapter 208 and the data engine 210 shown and described herein with respect to FIG. 2), one or more systems (e.g., similar to the system 130 shown and described herein with respect to FIGS. 1A and 1B), one or more end-point devices (e.g., similar to the end-point device(s) 140 shown and described herein with respect to FIGS. 1A and 1C), and/or the like may perform one or more of the steps of the process flow 300.

As shown in block 302, the process flow 300 may include receiving, from a first user device, a first record for initiating a first transaction, where the first record includes first data fields. For example, the first record may be similar to the record 202 shown and described herein with respect to FIG. 2. In some embodiments, the first transaction may be a loan trade, the first record may include an email and a CSV-formatted funding schedule, and the CSV-formatted funding schedule may include collateral information for settling the loan trade.

In some embodiments, the first data fields may include first labels and first transaction data, and the first labels may include first identifiers of the first transaction data. Additionally, or alternatively, the first transaction data may include first information items for conducting the first transaction, and each first data field of the first data fields may include (i) a first identifier of the first identifiers or (ii) a first information item of the first information items. In some embodiments, the process flow 300 may include analyzing, using the data adapter, the first record to determine for each first data field whether the first data field includes (i) a first identifier or (ii) a first information item.

As shown in block 304, the process flow 300 may include determining, using a data adapter, first relationships between the first data fields. For example, the data adapter may be similar to the data adapter 208 shown and described herein with respect to FIG. 2. In some embodiments, the process flow 300 may include determining, using the data adapter, the first relationships between the first labels and the first transaction data by determining for each first information item a corresponding first identifier.

As shown in block 306, the process flow 300 may include determining, using a data engine, whether the first record includes required information for conducting the first transaction based on a messaging standard and based on the first relationships between the first data fields. For example, the data engine may be similar to the data engine 210 shown and described herein with respect to FIG. 2. In some embodiments, the data engine may be configured by a configuration file to determine whether records include required information for conducting transactions and generate standard-compliant messages for initiating transactions, and the configuration file may be based on technical literature establishing the messaging standard. Additionally, or alternatively, the data engine may include one of more machine learning models configured to determine whether records include required information for conducting transactions and generate standard-compliant messages for initiating transactions. In some embodiments, the process flow 300 may include determining, using the data engine, whether the first record includes required information for conducting the first transaction based on the first labels and the first transaction data.

As shown in block 308, the process flow 300 may include generating, using the data engine and in response to determining that the first record includes required information for conducting the first transaction, a first message using the messaging standard and based on first transaction data in the first data fields. For example, the first message may be similar to the standard-compliant message shown and described herein with respect to FIG. 2. In some embodiments, the messaging standard (e.g., similar to the messaging system described herein with respect to FIG. 2) may include a metadata repository and messaging syntaxes for conducting transactions. In such embodiments, the process flow 300 may include, when generating the first message, generating, using the data engine, the first message using the metadata repository and the messaging syntaxes of the messaging standard.

As show in block 310, the process flow 300 may include transmitting the first message via a transaction network to a system for conducting transactions, where transmitting the first message to the system causes the system to conduct the first transaction. For example, the transaction network may be similar to the transaction network 216 shown and described herein with respect to FIG. 2. In some embodiments, the transaction network may include a communication network between systems of a plurality of financial institutions for securely communicating messages for conducting transactions.

In some embodiments, the process flow 300 may include receiving, from a second user device, a second record for initiating a second transaction, where the second record includes second data fields in a second format different from the first format, and determining, using the data adapter, second relationships between the second data fields. The process flow 300 may include determining, using the data engine, whether the second record includes required information for conducting the second transaction based on the messaging standard and based on the second relationships and generating, using the data engine and in response to determining that the second record includes required information for conducting the second transaction, a second message using the messaging standard and based on the second transaction data. The process flow 300 may include transmitting the second message via the transaction network to the system for conducting transactions, where transmitting the second message to the system causes the system to conduct the second transaction. In some embodiments, the second transaction may be a mortgage-backed security trade, the second record may include an email and a CSV-formatted pool settlement, and the CSV-formatted pool settlement may include information associated with the mortgage-backed security.

In some embodiments, the second data fields may include second labels and second transaction data, and the second labels may include second identifiers of the second transaction data. Additionally, or alternatively, the second transaction data may include second information items for conducting the second transaction, and each second data field of the second data fields may include (i) a second identifier of the second identifiers or (ii) a second information item of the second information items. In some embodiments, the process flow 300 may include, when determining whether the second record includes required information for conducting the second transaction, determining, using the data engine, whether the second record includes required information for conducting the second transaction based on the second labels and the second transaction data.

In some embodiments, the process flow 300 may include analyzing, using the data adapter, the second record to determine for each second data field whether the second data field includes (i) a second identifier or (ii) a second information item. Additionally, or alternatively, the process flow 300 may include, when determining the second relationships between the second data fields, determining, using the data adapter, the second relationships between the second labels and the second transaction data by determining for each second information item a corresponding second identifier.

In some embodiments, the first transaction may be between a first entity and a second entity, and the process flow 300 may include transmitting, in response to transmitting the first message, a first notification to a first system of the first entity confirming transmission of the first message and a second notification to a second system of the second entity confirming transmission of the first message. Additionally, or alternatively, the second transaction may be between a first entity, a second entity, and a third entity, and the process flow 300 may include transmitting, in response to transmitting the second message, a first notification to a first system of the first entity confirming transmission of the second message, a second notification to a second system of the second entity confirming transmission of the second message, and a third notification to a third system of the third entity confirming transmission of the second message.

In some embodiments, the process flow 300 may include receiving, from user devices, records for initiating transactions, where each of the records includes data fields in a format, and where the data fields of the records have a plurality of formats. The data fields may include labels and transaction data, where the labels include identifiers of the transaction data. The transaction data may include information items for conducting a transaction, where each data field of the data fields includes (i) an identifier of the identifiers or (ii) an information item of the first information items. The process flow 300 may include analyzing, using a data adapter configured to analyze records for initiating transactions to identify relationships between data fields in the records, the records to determine, for each data field of each record, whether the data field includes (i) an identifier or (ii) an information item. The process flow 300 may include determining, using the data adapter and for each record, relationships between the labels and the transaction data by determining for each information item a corresponding identifier. The process flow 300 may include determining, using a data engine configured to generate standard-compliant messages for initiating transactions based on the records and for each record, whether the record includes required information for conducting the transaction based on a messaging standard, based on the labels and the transaction data of the record, and based on the relationships between the labels and the transaction data of the record, where the messaging standard includes a metadata repository and messaging syntaxes for conducting transactions. The process flow 300 may include generating, using the data engine, in response to determining that a subset of records include required information for conducting the transactions, and for each record of the subset of records, a message using the metadata repository and the messaging syntaxes of the messaging standard and based on the transaction data of the record. The process flow 300 may include transmitting, for each record of the subset of records, the message via a transaction network to a system for conducting transactions.

FIG. 4 illustrates an exemplary architecture of a machine learning (ML) subsystem 400, in accordance with an embodiment of the invention. The machine learning subsystem 400 may include a data acquisition engine 402, a data ingestion engine 410, a data pre-processing engine 416, a ML model tuning engine 422, and an inference engine 436. In some embodiments, one or more systems including data adapters and data engines (e.g., similar to the data adapter 208 and the data engine 210 shown and described herein with respect to FIG. 2), one or more systems (e.g., similar to the system 130 shown and described herein with respect to FIGS. 1A and 1B), one or more end-point devices (e.g., similar to the end-point device(s) 140 shown and described herein with respect to FIGS. 1A and 1C), and/or the like may include and/or use the machine learning subsystem 400 to perform one or more of the steps of the process flow 300.

The data acquisition engine 402 may identify various internal and/or external data sources to generate, test, and/or integrate new features for training a machine learning model 424. These internal and/or external data sources 404, 406, and 408 may be initial locations where the data originates or where physical information is first digitized. The data acquisition engine 402 may identify the location of the data and describe connection characteristics for access and retrieval of data. In some embodiments, data is transported from each data source 404, 406, or 408 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the data sources 404, 406, and 408 may include Enterprise Resource Planning (ERP) databases that host data related to day-to-day business activities such as accounting, procurement, project management, exposure management, supply chain operations, and/or the like, a mainframe that is often an entity's central data processing center, edge devices that may be any piece of hardware, such as sensors, actuators, gadgets, appliances, and/or machines, that are programmed for certain applications and can transmit data over the internet or other networks, and/or the like. The data acquired by the data acquisition engine 402 from these data sources 404, 406, and 408 may then be transported to the data ingestion engine 410 for further processing. In some embodiments, the data sources 404, 406, and 408 may include historical data associated with historical records for initiating historical transactions and historical determinations of whether the historical records included required information for conducting the historical transactions. Additionally, or alternatively, the data sources 404, 406, and 408 may include historical data associated with historical records for initiating historical transactions and historical standard-compliant messages generated for initiating the historical transactions.

Depending on the nature of the data imported from the data acquisition engine 402, the data ingestion engine 410 may move the data to a destination for storage or further analysis. Typically, the data imported from the data acquisition engine 402 may be in varying formats as they come from different sources, including RDBMS, other types of databases, S3 buckets, CSVs, or from streams. Since the data comes from different places, it needs to be cleansed and transformed so that it can be analyzed together with data from other sources. At the data acquisition engine 402, the data may be ingested in real-time, using a stream processing engine 412, in batches using the batch data warehouse 414, or a combination of both. The stream processing engine 412 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 414 collects and transfers data in batches according to scheduled intervals, trigger events, or any other logical ordering.

In machine learning, the quality of data and the useful information that can be derived therefrom directly affects the ability of the machine learning model 424 to learn. The data pre-processing engine 416 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 416 may implement feature extraction and/or selection techniques to generate training data 418. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 418 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 422 may be used to train a machine learning model 424 using the training data 418 to make predictions or decisions without explicitly being programmed to do so. The machine learning model 424 represents what was learned by the selected machine learning algorithm 420 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 422 may repeatedly execute cycles of initialization 426, testing 428, and calibration 430 to optimize the performance of the machine learning algorithm 420 and refine the results in preparation for deployment of those results for consumption or decision making. To this end, the ML model tuning engine 422 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 418. A fully trained machine learning model 432 is one whose hyperparameters are tuned and model accuracy maximized.

The trained machine learning model 432, similar to any other software application output, can be persisted to storage, file, memory, or application, or looped back into the processing component to be reprocessed. More often, the trained machine learning model 432 is deployed into an existing production environment to make practical business decisions based on live data 434. To this end, the machine learning subsystem 400 uses the inference engine 436 to make such decisions. The type of decision-making may depend upon the type of machine learning algorithm used. For example, machine learning models trained using supervised learning algorithms may be used to structure computations in terms of categorized outputs (e.g., C_1, C_2 . . . C_n 438) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . C_n 438) live data 434 based on how similar they are to one another to solve exploratory challenges where little is known about the data, provide a description or label (e.g., C_1, C_2 . . . C_n 438) to live data 434, such as in classification, and/or the like. These categorized outputs, groups (clusters), or labels are then presented to a user input system 440, which may be similar to the end-point device(s) 140 shown and described herein with respect to FIGS. 1A-1C. In still other cases, machine learning models that perform regression techniques may use live data 434 to predict or forecast continuous outcomes.

As noted, in some embodiments, one or more systems including data adapters and data engines (e.g., similar to the data adapter 208 and the data engine 210 shown and described herein with respect to FIG. 2), one or more systems (e.g., similar to the system 130 shown and described herein with respect to FIGS. 1A and 1B), one or more end-point devices (e.g., similar to the end-point device(s) 140 shown and described herein with respect to FIGS. 1A and 1C), and/or the like may include and/or use the machine learning subsystem 400 to perform one or more of the steps of the process flow 300. For example, a data engine may include one or more machine learning models similar to trained machine learning model 432 and/or one or more inference engines similar to the inference engine 436. In some embodiments, the data engine may use the one or more machine learning models and/or the one or more inference engines to determine whether the records include required information for conducting the transactions. Additionally, or alternatively, the data engine may use the one or more machine learning models and/or the one or more inference engines to generate messages using a messaging standard (e.g., standard-compliant messages) for initiating and/or conducting transactions.

It will be understood that the embodiment of the machine learning subsystem 400 illustrated in FIG. 4 is exemplary and that other embodiments may vary. As another example, in some embodiments, the machine learning subsystem 400 may include more, fewer, or different components.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (e.g., a non-transitory computer readable medium including firmware, resident software, micro-code, computer program code, and/or the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for maintaining data integrity and security during data transfer between electronic devices, the system comprising:

a data adapter configured to analyze records for initiating transactions to identify relationships between data fields in the records, wherein the data adapter comprises a pluggable data driver of a Regulated Extract Transform Loading (RETL) process, and wherein the data adapter comprises:

a funding data adapter configured to analyze and extract data from collateral funding schedules for loan trade settlements; and a pool settlement data adapter configured to analyze and extract data from pool settlements for mortgage-backed security trade settlements;

a data engine configured to generate standard-compliant messages for initiating transactions based on the records;

a processing device; and a non-transitory storage device comprising computer program code stored thereon, wherein the computer program code comprises computer instructions configured to cause the processing device to:

receive, from a first user device, a first record for initiating a first transaction, wherein the first record comprises first data fields, and wherein:

the first transaction is a loan trade, the first record comprises an email and a CSV-formatted funding schedule, and the CSV-formatted funding schedule comprises collateral information for settling the loan trade; or the first transaction is a mortgage-backed security trade, the first record comprises an email and a CSV-formatted pool settlement, and the CSV-formatted pool settlement comprises information associated with the mortgage-backed security trade;

determine, using the pluggable data driver and either the funding data adapter or the pool settlement data adapter of the data adapter, first relationships between the first data fields in the CSV-formatted funding schedule or the CSV-formatted pool settlement;

determine, using the data engine, whether the first record comprises required information for conducting the loan trade or the mortgage-backed security trade based on a messaging standard and based on the first relationships between the first data fields;

generate, using the data engine and in response to determining that the first record comprises required information for conducting the loan trade or the mortgage-backed security trade, a first message using the messaging standard and based on first transaction data in the first data fields by mapping data from the CSV-formatted funding schedule or the CSV-formatted pool settlement to categories and elements of the messaging standard in XML and JSON; and transmit the first message via a transaction network to another system for conducting transactions, wherein transmitting the first message to the other system causes the other system to conduct the loan trade or the mortgage-backed security trade.

2. The system of claim 1, wherein the messaging standard comprises a metadata repository and messaging syntaxes for conducting transactions.

3. The system of claim 2, wherein the computer program code comprises computer instructions configured to cause the processing device to, when generating the first message, generate, using the data engine, the first message using the metadata repository and the messaging syntaxes of the messaging standard.

4. The system of claim 1, wherein the data engine is configured by a configuration file to determine whether records comprise required information for conducting transactions and generate standard-compliant messages for initiating transactions, and wherein the configuration file is based on technical literature establishing the messaging standard.

5. The system of claim 1, wherein the data engine comprises one of more machine learning models configured to determine whether records comprise required information for conducting transactions and generate standard-compliant messages for initiating transactions.

6. The system of claim 1, wherein:

the first data fields comprise first labels and the first transaction data;

the first labels comprise first identifiers of the first transaction data;

the first transaction data comprises first information items for conducting the first transaction; and each first data field of the first data fields comprises (i) a first identifier of the first identifiers or (ii) a first information item of the first information items.

7. The system of claim 6, wherein the computer program code comprises computer instructions configured to cause the processing device to analyze, using the data adapter, the first record to determine for each first data field whether the first data field comprises (i) a first identifier or (ii) a first information item.

8. The system of claim 7, wherein the computer program code comprises computer instructions configured to cause the processing device to, when determining the first relationships between the first data fields, determine, using the data adapter, the first relationships between the first labels and the first transaction data by determining for each first information item a corresponding first identifier.

9. The system of claim 8, wherein the computer program code comprises computer instructions configured to cause the processing device to, when determining whether the first record comprises required information for conducting the first transaction, determine, using the data engine, whether the first record comprises required information for conducting the first transaction based on the first labels and the first transaction data.

10. The system of claim 1, wherein the first transaction is between a first entity and a second entity, and wherein the computer program code comprises computer instructions configured to cause the processing device to transmit, in response to transmitting the first message, a first notification to a first system of the first entity confirming transmission of the first message and a second notification to a second system of the second entity confirming transmission of the first message.

11. The system of claim 1, wherein the first transaction is between a first entity, a second entity, and a third entity and wherein the computer program code comprises computer instructions configured to cause the processing device to transmit, in response to transmitting the first message, a first notification to a first system of the first entity confirming transmission of the first message, a second notification to a second system of the second entity confirming transmission of the first message, and a third notification to a third system of the third entity confirming transmission of the first message.

12. The system of claim 1, wherein the computer program code comprises computer instructions configured to cause the processing device to:

receive, from a second user device, a second record for initiating a second transaction, wherein the second record comprises second data fields in a second format different from a first format of the first data fields of the first record;

determine, using the data adapter, second relationships between the second data fields;

determine, using the data engine, whether the second record comprises required information for conducting the second transaction based on the messaging standard and based on the second relationships;

generate, using the data engine and in response to determining that the second record comprises required information for conducting the second transaction, a second message using the messaging standard and based on second transaction data in the second data fields; and transmit the second message via the transaction network to the other system for conducting transactions, wherein transmitting the second message to the other system causes the other system to conduct the second transaction.

13. The system of claim 1, wherein the transaction network comprises a communication network between systems of a plurality of financial institutions for securely communicating messages for conducting transactions.

14. A computer program product for maintaining data integrity and security during data transfer between electronic devices, the computer program product comprising a non-transitory computer-readable medium comprising code causing an apparatus to:

receive, from a first user device, a first record for initiating a first transaction, wherein the first record comprises first data fields, and wherein:

the first transaction is a loan trade, the first record comprises an email and a CSV-formatted funding schedule, and the CSV-formatted funding schedule comprises collateral information for settling the loan trade; or the first transaction is a mortgage-backed security trade, the first record comprises an email and a CSV-formatted pool settlement, and the CSV-formatted pool settlement comprises information associated with the mortgage-backed security trade;

determine, using a pluggable data driver and either a funding data adapter or a pool settlement data adapter of a data adapter of the apparatus, first relationships between the first data fields in the CSV-formatted funding schedule or the CSV-formatted pool settlement, wherein the data adapter is configured to analyze records for initiating transactions to identify relationships between data fields in the records, wherein the data adapter comprises a pluggable data driver of a Regulated Extract Transform Loading (RETL) process, and wherein the data adapter comprises:

the funding data adapter configured to analyze and extract data from collateral funding schedules for loan trade settlements; and the pool settlement data adapter configured to analyze and extract data from pool settlements for mortgage-backed security trade settlements;

determine, using a data engine of the apparatus, whether the first record comprises required information for conducting the loan trade or the mortgage-backed security trade based on a messaging standard and based on the first relationships between the first data fields, wherein the data engine is configured to generate standard-compliant messages for initiating transactions based on the records;

generate, using the data engine and in response to determining that the first record comprises required information for conducting the loan trade or the mortgage-backed security trade, a first message using the messaging standard and based on first transaction data in the first data fields by mapping data from the CSV-formatted funding schedule or the CSV-formatted pool settlement to categories and elements of the messaging standard in XML and JSON; and transmit the first message via a transaction network to a system for conducting transactions, wherein transmitting the first message to the system causes the system to conduct the loan trade or the mortgage-backed security trade.

15. The computer program product of claim 14, wherein the messaging standard comprises a metadata repository and messaging syntaxes for conducting transactions.

16. The computer program product of claim 15, wherein the non-transitory computer-readable medium comprises code causing the apparatus to, when generating the first message, generate, using the data engine, the first message using the metadata repository and the messaging syntaxes of the messaging standard.

17. The computer program product of claim 14, wherein the data engine is configured by a configuration file to determine whether records comprise required information for conducting transactions and generate standard-compliant messages for initiating transactions, and wherein the configuration file is based on technical literature establishing the messaging standard.

18. A method for maintaining data integrity and security during data transfer between electronic devices, the method comprising:

receiving, from a first user device, a first record for initiating a first transaction, wherein the first record comprises first data fields, and wherein:

the first transaction is a loan trade, the first record comprises an email and a CSV-formatted funding schedule, and the CSV-formatted funding schedule comprises collateral information for settling the loan trade; or the first transaction is a mortgage-backed security trade, the first record comprises an email and a CSV-formatted pool settlement, and the CSV-formatted pool settlement comprises information associated with the mortgage-backed security trade;

determining, using a pluggable data driver and either a funding data adapter or a pool settlement data adapter of a data adapter of the apparatus, first relationships between the first data fields in the CSV-formatted funding schedule or the CSV-formatted pool settlement, wherein the data adapter is configured to analyze records for initiating transactions to identify relationships between data fields in the records, wherein the data adapter comprises the pluggable data driver of a Regulated Extract Transform Loading (RETL) process, and wherein the data adapter comprises:

the funding data adapter configured to analyze and extract data from collateral funding schedules for loan trade settlements; and the pool settlement data adapter configured to analyze and extract data from pool settlements for mortgage-backed security trade settlements;

determining, using a data engine of the apparatus, whether the first record comprises required information for conducting the loan trade or the mortgage-backed security trade based on a messaging standard and based on the first relationships between the first data fields, wherein the data engine is configured to generate standard-compliant messages for initiating transactions based on the records;

generating, using the data engine and in response to determining that the first record comprises required information for conducting the loan trade or the mortgage- backed security trade, a first message using the messaging standard and based on first transaction data in the first data fields by mapping data from the CSV-formatted funding schedule or the CSV-formatted pool settlement to categories and elements of the messaging standard in XML and JSON; and transmitting the first message via a transaction network to a system for conducting transactions, wherein transmitting the first message to the system causes the system to conduct the loan trade or the mortgage-backed security trade.

19. The method of claim 18, wherein the messaging standard comprises a metadata repository and messaging syntaxes for conducting transactions.

20. The method of claim 19, wherein the method comprises, when generating the first message, generating, using the data engine, the first message using the metadata repository and the messaging syntaxes of the messaging standard.

* * * * *